(12) United States Patent
Takahashi

(10) Patent No.: US 10,711,993 B2
(45) Date of Patent: Jul. 14, 2020

(54) EXHAUST HEAT RECOVERY DEVICE AND BINARY ELECTRICITY GENERATION DEVICE

(71) Applicant: Kobe Steel, Ltd., Kobe-shi (JP)

(72) Inventor: Kazuo Takahashi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 74 days.

(21) Appl. No.: 15/998,958

(22) PCT Filed: Jan. 25, 2017

(86) PCT No.: PCT/JP2017/002451
§ 371 (c)(1),
(2) Date: Aug. 17, 2018

(87) PCT Pub. No.: WO2017/141646
PCT Pub. Date: Aug. 24, 2017

(65) Prior Publication Data
US 2019/0264906 A1    Aug. 29, 2019

(30) Foreign Application Priority Data

Feb. 19, 2016 (JP) .................................. 2016-030233

(51) Int. Cl.
*F01K 23/10* (2006.01)
*F22B 1/18* (2006.01)
(Continued)

(52) U.S. Cl.
CPC ............ *F22B 1/1807* (2013.01); *F01K 23/10* (2013.01); *F01K 25/10* (2013.01); *F01N 5/02* (2013.01);
(Continued)

(58) Field of Classification Search
CPC ...... F01K 23/10; F01K 23/101; F01K 23/105; F02G 5/02
See application file for complete search history.

(56) References Cited

U.S. PATENT DOCUMENTS 4,031,862 A    6/1977  Smith

FOREIGN PATENT DOCUMENTS

CN    103925025 A    7/2014
CN    104061030 A    9/2014
(Continued)

OTHER PUBLICATIONS

Machine translation of JP 2004061008 A, accessed Dec. 21, 2019. (Year: 2019).*

(Continued)

*Primary Examiner* — Jonathan R Matthias
(74) *Attorney, Agent, or Firm* — Oblon, McClelland, Maier & Neustadt, L.L.P.

(57) ABSTRACT

An exhaust heat recovery device includes: a main passage through which an exhaust gas containing a corrosive component flows; a boiler which heats a heat medium using the exhaust gas; a bypass passage connected to the main passage so as to detour around the boiler; a regulation valve member which regulates a flow rate of the exhaust gas flowing into the boiler; a heat medium circuit which circulates the heat medium that is heated to be in a hot-water state by the boiler; a binary electricity generation device which recovers thermal energy from the heat medium in the heat medium circuit and generates electricity; and a valve control unit which controls an opening of the regulation valve member such that a temperature of the exhaust gas passed through the boiler is equal to or higher than a temperature of an acid dew-point of the corrosive component in the exhaust gas.

7 Claims, 7 Drawing Sheets

(51) Int. Cl.
*F01N 5/02* (2006.01)
*F02G 5/02* (2006.01)
*F01K 25/10* (2006.01)

(52) U.S. Cl.
CPC .............. *F02G 5/02* (2013.01); *Y02P 80/152* (2015.11); *Y02T 10/166* (2013.01)

(56) References Cited

FOREIGN PATENT DOCUMENTS

| | | |
|---|---|---|
| DE | 31 26 321 A1 | 2/1982 |
| EP | 0 931 978 B1 | 12/2003 |
| JP | 8-246814 A | 9/1996 |
| JP | 2004-61008 A | 2/2004 |
| JP | 2013-160132 A | 8/2013 |
| JP | 2014-9624 A | 1/2014 |

OTHER PUBLICATIONS

Machine translation of CN 104061030 A, accessed Dec. 21, 2019. (Year: 2019).*
International Search Report dated Mar. 21, 2017 in PCT/JP2017/002451 filed Jan. 25, 2017.

* cited by examiner

EXHAUST HEAT RECOVERY DEVICE AND BINARY ELECTRICITY GENERATION DEVICE

TECHNICAL FIELD

The present invention relates to an exhaust heat recovery device and a binary electricity generation device.

BACKGROUND ART

Conventionally, as disclosed in the following Patent Literature 1, for example, an exhaust heat recovery device including a binary electricity generation device is known. In an exhaust heat recovery device disclosed in the following Patent Literature 1, it is designed such that a working medium is evaporated in an evaporator of a binary electricity generation device, using heat of cooling water of an engine, and a power turbine is driven by the evaporated working medium, to generate electricity.

In the above-described exhaust heat recovery device disclosed in Patent Literature 1, cooling water of an engine is used as a heat source for evaporating a working medium of the binary electricity generation device. In the meantime, it is conceivable to use heat of an exhaust gas as a heat source. In this case, in an attempt to recover heat from an exhaust gas containing a corrosive component such as sulfur, there is a fear that a corrosive component may condense from a low-temperature exhaust gas from which heat is recovered, to corrode a pipe and the like. For this reason, it is unable to excessively recover heat of an exhaust gas, and thus, there arises a problem of inability to efficiently generate electricity.

CITATION LIST

Patent Literature

Patent Literature 1: JP 2013-160132 A

SUMMARY OF INVENTION

It is an object of the present invention to efficiently recover heat from an exhaust gas containing a corrosive component.

An exhaust heat recovery device according to one aspect of the present invention includes: a main passage through which an exhaust gas containing a corrosive component flows; a boiler provided in the main passage, the boiler being configured to heat a heat medium using the exhaust gas so as to place the heat medium in a hot-water state; a bypass passage connected to the main passage so as to detour around the boiler; a regulation valve member configured to regulate a flow rate of the exhaust gas flowing into the boiler; a heat medium circuit including a hot-water pump, the heat medium circuit being configured to circulate the heat medium that is heated so as to be placed in the hot-water state by the boiler; a binary electricity generation device including a circulation circuit through which a working medium circulates, the binary electricity generation device being configured to recover thermal energy from the heat medium in the heat medium circuit and generate electricity; and a valve control unit configured to control an opening of the regulation valve member such that a temperature of the exhaust gas passed through the boiler is equal to or higher than a temperature of an acid dew-point of the corrosive component in the exhaust gas.

Also, a binary electricity generation device according to one aspect of the present invention is a binary electricity generation device which is used as the binary electricity generation device of the above-described exhaust heat recovery device.

DESCRIPTION OF EMBODIMENTS

Hereinafter, embodiments for carrying out the present invention will be described in detail with reference to the drawings.

Figure 1:
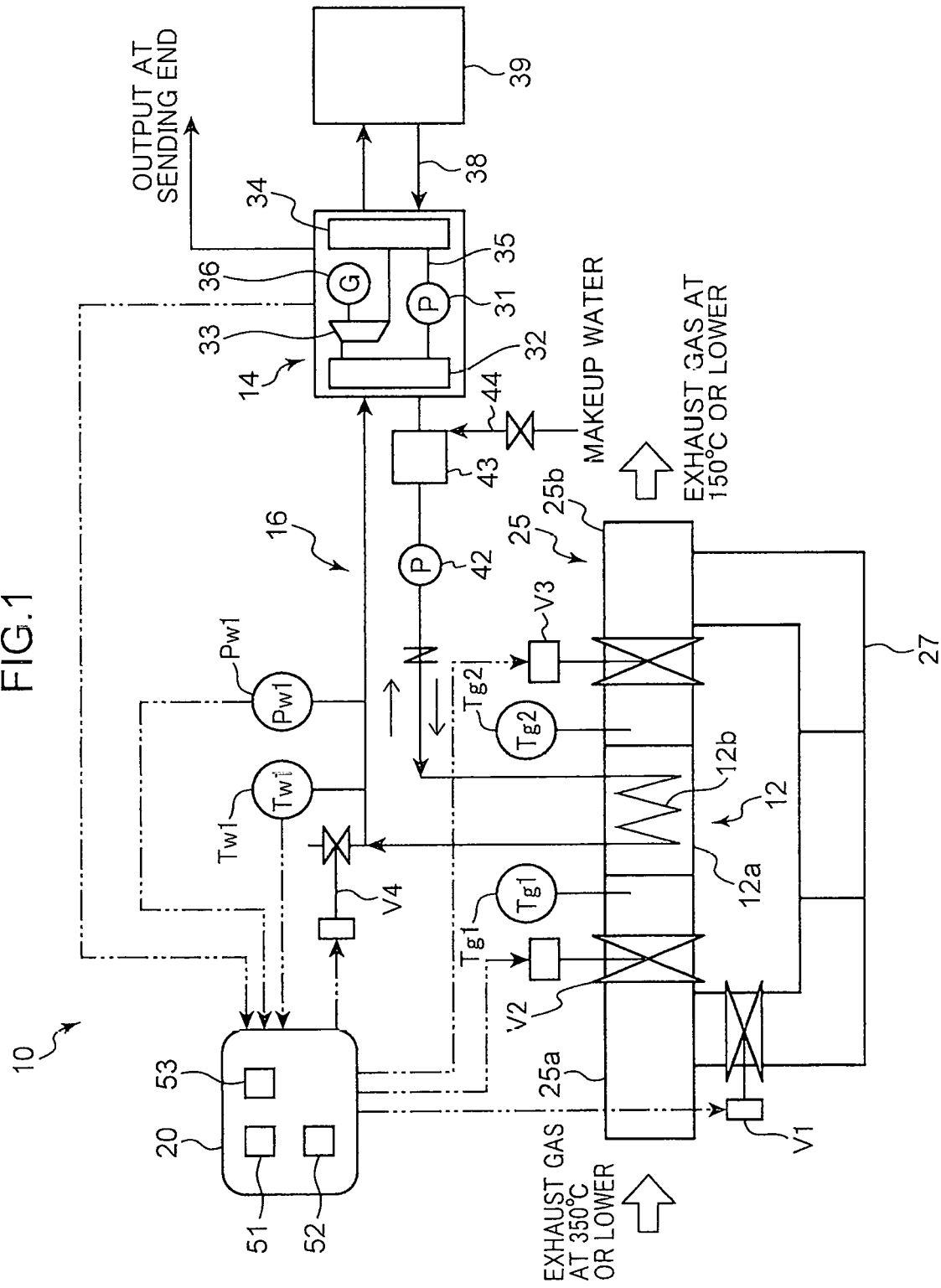
FIG. 1 is a view schematically showing an overall configuration of an exhaust heat recovery device according to an embodiment of the present invention.

As shown in FIG. 1, an exhaust heat recovery device 10 according to the present embodiment is a device for recovering exhaust heat from a gas which is used as a heat-source gas of a boiler 12, and includes the boiler 12, a binary electricity generation device 14, a heat medium circuit 16, and a controller 20. The boiler 12 and the binary electricity generation device 14 are connected with each other via the heat medium circuit 16.

The boiler 12 is connected with a main passage 25 though which an exhaust gas serving as a heat-source gas flows. The main passage 25 includes an upstream portion 25a and a downstream portion 25b which are located on an upstream side and a downstream side, respectively, with the boiler 12 connected with the heat medium circuit 16 being interposed therebetween. The boiler 12 has a configuration in which a pipe 12b is housed in a housing 12a, and a heat medium flowing throughout the heat medium circuit 16 flows into the pipe 12b. On the other hand, an exhaust gas which is introduced into the housing 12a of the boiler 12 from the upstream portion 25a heats a heat medium in the pipe 12b, and subsequently, is discharged to the downstream portion 25b. An exhaust gas which is discharged from the downstream portion 25b is sent to an apparatus for processing an exhaust gas, for example, or is discharged to the outside.

An exhaust gas has a temperature between approximately 250° C. and 350° C., for example, before being introduced into the boiler 12. Then, in the boiler 12, a heat medium is heated by an exhaust gas so as to become hot water (or so as to be kept in a hot-water state). For example, a heat medium is heated in the boiler 12 so as to become hot water having a temperature between approximately 100° C. and 150° C., for example.

The upstream portion 25a and the downstream portion 25b are provided with flow-rate regulation valves V2 and V3, respectively. Each of those flow-rate regulation valves V2 and V3 includes a valve of which opening is adjustable.

By a change in an opening of the flow-rate regulation valve V2 or V3, a flow rate of an exhaust gas which flows through the main passage 25 is regulated. The flow-rate regulation valve V2 or the flow-rate regulation valve V3 functions as a regulation valve member for regulating a flow rate of an exhaust gas which flows into the boiler 12. It is noted that one of the flow-rate regulation valve V2 and the flow-rate regulation valve V3 can be omitted.

It is additionally noted that although an exhaust gas is used as a heat-source gas in the present embodiment, a heat-source gas is not limited to that and high-temperature air or the like may be used, for example. It is preferable that air in such a case has a temperature between approximately 250° C. and 350° C., for example.

A bypass passage 27 is connected with the main passage 25 so as to detour around the boiler 12. The bypass passage 27 has one end connected with the upstream portion 25a of the main passage 25 and has the other end connected with the downstream portion 25b of the main passage 25. The bypass passage 27 is provided with a flow-rate regulation valve V1. The flow-rate regulation valve V1 includes a valve of which opening is adjustable. By a change in an opening of the flow-rate regulation valve V1, a flow rate of an exhaust gas which flows through the bypass passage 27 is regulated. The flow-rate regulation valve V1 provided in the bypass passage 27 functions as a regulation valve member for regulating a flow rate of an exhaust gas which flows into the boiler 12.

In the upstream portion 25a and the downstream portion 25b of the main passage 25, temperature sensors Tg1 and Tg2 are provided, respectively. The temperature sensor Tg1 senses a temperature of an exhaust gas which is introduced into the boiler 12, and outputs a signal indicative of a sensed temperature. The temperature sensor Tg2 senses a temperature of an exhaust gas which is discharged from the boiler 12, and outputs a signal indicative of a sensed temperature.

The binary electricity generation device 14 includes a circulation circuit 35 for a working medium, the circulation circuit 35 including an actuating pump 31, an evaporator 32, an expander 33, and a condenser 34. When the actuating pump 31 is driven, a working medium circulates through the circulation circuit 35. A working medium is a low-boiling refrigerant such as R245fa. The actuating pump 31 includes a pump of which rotation speed is adjustable.

The evaporator 32 is configured to heat a working medium using a heat medium, to evaporate a working medium. The expander 33 expands a gaseous working medium which is obtained in the evaporator 32. The expander 33 is connected with an electricity generator 36, and generation of electricity by the electricity generator 36 is achieved by behaviors of the expander 33. The condenser 34 cools a working medium which is expanded in the expander 33 using a cooling medium (such as cooling water) which flows through a cooling circuit 38, and condenses a gaseous working medium. The cooling circuit 38 is connected with a cooler 39.

The heat medium circuit 16 is connected with the pipe 12b of the boiler 12, and is also connected with the evaporator 32 of the binary electricity generation device 14. The heat medium circuit 16 is placed in an enclosed state so that a heat medium which is heated in the boiler 12 can circulate while being kept in a hot-water state. Also, the heat medium circuit 16 includes a pipeline which is highly resistant to a pressure and can withstand a hot-water state.

In the heat medium circuit 16, a hot-water pump (heat medium pump) 42, a tank 43, a degassing valve V4, and a replenishment unit 44 are provided. When the hot-water pump 42 is driven, a heat medium circulates through the heat medium circuit 16 while being under a pressure. The tank 43 holds a part of a heat medium in the heat medium circuit 16. The tank 43 has a function as a buffer which serves in a case where a circulation flow rate of a heat medium is changed. The degassing valve V4 is used for releasing air in the heat medium circuit 16 when the circuit is supplied with water. The replenishment unit 44 is a portion for replenishing the heat medium circuit 16 with water.

It is noted that the tank 43 is disposed above the hot-water pump 42. Because of this, a head, i.e., a differential pressure, which depends on a difference in a height between the tank 43 and the hot-water pump 42, is applied to a suction side of the hot-water pump 42, so that cavitation in the hot-water pump 42 is prevented. However, a positional relationship between the tank 43 and the hot-water pump 42 is not limited to that.

In the heat medium circuit 16, a pressure sensor Pw1 and a temperature sensor Tw1 are provided. The pressure sensor Pw1 and the temperature sensor Tw1 are located downstream of the boiler 12, more specifically, between the boiler 12 and the binary electricity generation device 14, in the heat medium circuit 16. The pressure sensor Pw1 detects a pressure of a heat medium which is heated in the boiler 12, and outputs a signal indicative of a sensed pressure. The temperature sensor Tw1 detects a temperature of a heat medium which is heated in the boiler 12, and outputs a signal indicative of a sensed temperature.

The controller 20 is a control unit for controlling operations of the exhaust heat recovery device 10 and receives a signal output from each of the temperature sensor Tg1, the temperature sensor Tg2, the pressure sensor Pw1, and the temperature sensor Tw1.

The controller 20 fulfils predetermined functions by executing programs stored in a memory unit not shown in the drawings. The functions include an operation control unit 51, a supercooling-degree deriving unit 52, and a valve control unit 53.

The operation control unit 51 exercises control for performing a start-up operation, a normal operation, and a stop operation. A start-up operation is an operation performed in activating the exhaust heat recovery device 10; a normal operation is an operation performed while the binary electricity generation device 14 is operating; and a stop operation is an operation performed in stopping the exhaust heat recovery device 10. In each of the operations, the operation control unit 51 controls opening and closing of the flow-rate regulation valves V1, V2, and V3 and the degassing valve V4, and controls drive of the hot-water pump 42 and the actuating pump 31.

The supercooling-degree deriving unit 52 derives a supercooling degree Sc of a heat medium in the heat medium circuit 16, using a signal output from each of the pressure sensor Pw1 and the temperature sensor Tw1. More specifically, information which correlates a pressure and a saturation temperature of a heat medium is stored in the not-shown memory unit of the controller 20, and the supercooling-degree deriving unit 52 derives a saturation temperature Ts corresponding to a sensed pressure of the pressure sensor Pw1, using the information. Then, the supercooling-degree deriving unit 52 derives the supercooling degree Sc of a heat medium from a difference between the derived saturation temperature Ts and a sensed temperature tw1 of the temperature sensor Tw1.

The valve control unit 53 exercises control for suppressing boiling of a heat medium. More specifically, the valve control unit 53 controls opening and closing of the flow-rate regulation valves V1 and V2 such that a supercooling degree which is derived by the supercooling-degree deriving unit 52 exceeds a predetermined threshold value e (° C.).

Also, the valve control unit 53 exercises control for keeping a temperature of a gas discharged from the boiler 12, equal to or higher than a predetermined temperature f (° C.). More specifically, the valve control unit 53 controls openings of the flow-rate regulation valves V1 and V2 such that a sensed value of the temperature sensor Tg2 exceeds a predetermined threshold value f. It is noted that the valve control unit 53 may control not only openings of the flow-rate regulation valves V1 and V2, but also rotation speed of the hot-water pump 42.

Figure 2:
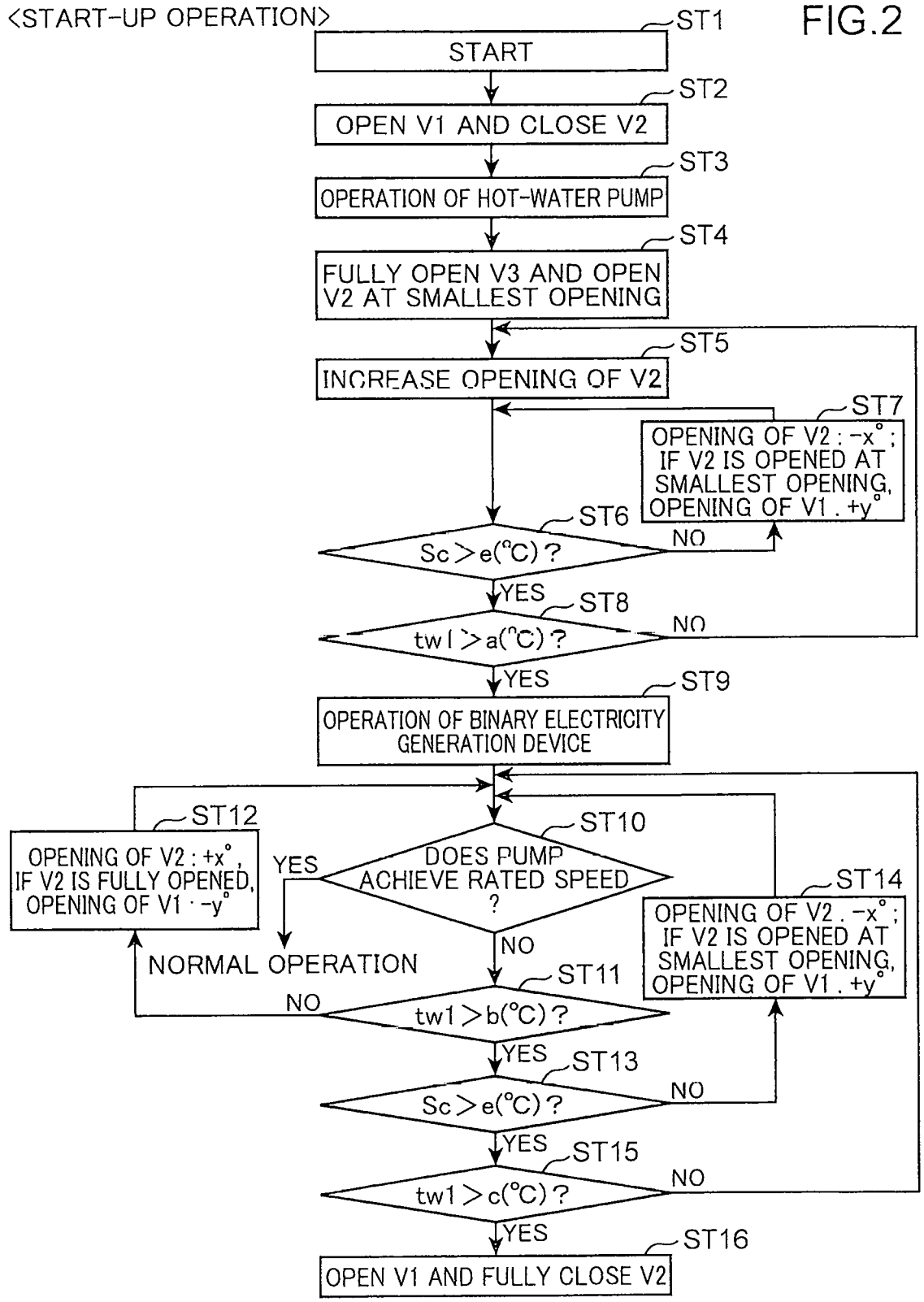
FIG. 2 is a flow chart for illustrating a start-up operation in the exhaust heat recovery device.

Next, behaviors for operations of the exhaust heat recovery device 10 according to the present embodiment will be described. First, behaviors for controlling a start-up operation of the exhaust heat recovery device 10 will be described with reference to FIG. 2.

When the operation control unit 51 starts a start-up operation (step ST1), the flow-rate regulation valve V1 of the bypass passage 27 is opened and the flow-rate regulation valve V2 of the main passage 25 is closed (step ST2). As a result of this, an exhaust gas serving as a heat-source gas is not introduced into the boiler 12, but flows through the bypass passage 27 and is discharged from the downstream portion 25b. It is noted that although also the flow-rate regulation valve V3 of the downstream portion 25b is closed, the flow-rate regulation valve V3 may be opened on condition that an exhaust gas would not flow into the boiler 12.

Subsequently, the operation control unit 51 starts driving the hot-water pump 42 (step ST3). As a result of this, a heat medium circulates through the heat medium circuit 16. Additionally, at that time, the operation control unit 51 causes a cooling medium to circulate through the cooling circuit 38.

Thereafter, the valve control unit 53 opens the flow-rate regulation valve V2 of the main passage 25 at the smallest opening, and also gradually increases an opening of the flow-rate regulation valve V2 (steps ST4 and ST5). At that time, the valve control unit 53, while checking a temperature of a heat medium flowing throughout the heat medium circuit 16 with the temperature sensor Tw1 on one hand, gradually increases an opening of the flow-rate regulation valve V2 so that the temperature of the heat medium (the sensed temperature tw1 of the temperature sensor Tw1) becomes equal to a target temperature. It is noted that also the flow-rate regulation valve V3 on a downstream side is opened along with an event in which the flow-rate regulation valve V2 is opened.

While an opening of the flow-rate regulation valve V2 is being gradually increased, it is checked whether or not the supercooling degree Sc of a heat medium exceeds the predetermined threshold value e (° C.) (step ST6). At that time, the supercooling degree Sc is derived from a difference between the saturation temperature Ts corresponding to a sensed pressure of the pressure sensor Pw1 and the sensed temperature tw1 of the temperature sensor Tw1. If the supercooling degree Sc is equal to or lower than the threshold value e, the valve control unit 53 reduces an opening of the flow-rate regulation valve V2 of the bypass passage 27 by a predetermined opening (step ST7). As a result of this, a flow rate of an exhaust gas which is introduced into the boiler 12 is reduced, so that a supercooling degree of a heat medium is increased. It is noted that the valve control unit 53 increases an opening of the flow-rate regulation valve V1 of the main passage 25 by a predetermined opening in a case where the flow-rate regulation valve V2 is opened at the smallest opening.

Then, when the sensed value tw1 of the temperature sensor Tw1 exceeds a predetermined temperature a (° C.), the operation control unit 51 activates the actuating pump 31 of the binary electricity generation device 14 (step ST8 and ST9). As a result of this, the binary electricity generation device 14 starts operating, so that generation of electricity is started. It is noted that the temperature a (° C.) is a temperature of a heat medium which is introduced into the evaporator 32, and is set as a temperature at which the binary electricity generation device 14 can stably generate electricity.

After the actuating pump 31 is activated, a temperature of a heat medium is further checked until the actuating pump 31 achieves a rated rotation speed. Then, when the actuating pump 31 achieves a rated rotation speed, the operation control unit 51 shifts from a start-up operation to a normal operation.

During a start-up operation, after the actuating pump 31 is activated, it is checked whether or not a rotation speed of the pump reaches a rated rotation speed (step ST10), and steps ST11 to ST16 are performed until a rated rotation speed is achieved. In the step ST11, it is judged whether or not a temperature of a heat medium (the sensed value tw1 of the temperature sensor Tw1) exceeds a lower limit value b (° C.) which is previously determined. If a temperature of a heat medium is equal to or lower than the lower limit value b, the valve control unit 53 increases an opening of the flow-rate regulation valve V2 of the upstream portion 25a by a predetermined opening (step ST12). As a result of this, a flow rate of an exhaust gas which flows into the boiler 12 is increased, so that a temperature of a heat medium can be raised. It is noted that the valve control unit 53 reduces an opening of the flow-rate regulation valve V1 of the bypass passage 27 in a case where the flow-rats regulation valve V2 is fully upened.

On the other hand, if a temperature of a heat medium exceeds the lower limit value b, a shift to the step ST13 is made, where it is judged whether or not the supercooling degree Sc of a heat medium exceeds the predetermined threshold value e (° C.). If the supercooling degree Sc of a heat medium is equal to or lower than the threshold value e, the valve control unit 53 reduces an opening of the flow-rate regulation valve V2 by a predetermined opening (step ST14). As a result of this, a temperature of a heat medium can be lowered because of reduction of a flow rate of an exhaust gas which flows into the boiler 12, so that the supercooling degree Sc of a heat medium can be increased. It is noted that the valve control unit 53 increases an opening of the flow-rate regulation valve V1 of the bypass passage 27 in a case where the flow-rate regulation valve V2 is opened at the smallest opening.

If the supercooling degree Sc of a heat medium has a value higher than the threshold value c, it is judged whether or not a temperature of a heat medium exceeds an upper limit value c (° C.) which is previously determined (step ST15). If a temperature of a heat medium is equal to or lower than the upper limit value c, a return to the step ST10 is made. On the other hand, if a temperature of a heat medium exceeds the upper limit value c, the valve control unit 53 fully opens the flow-rate regulation valve V2 of the main passage 25, and also opens the flow-rate regulation valve V1 of the bypass passage 27 (step ST16). In other words, in a case where a temperature of a heat medium exceeds the upper limit value c, an exhaust gas is prevented from being introduced into the boiler 12. In this manner, it is possible to prevent evaporation of hot water by ensuring a state in which a temperature of a heat medium falls within a predetermined range.

Figure 3:
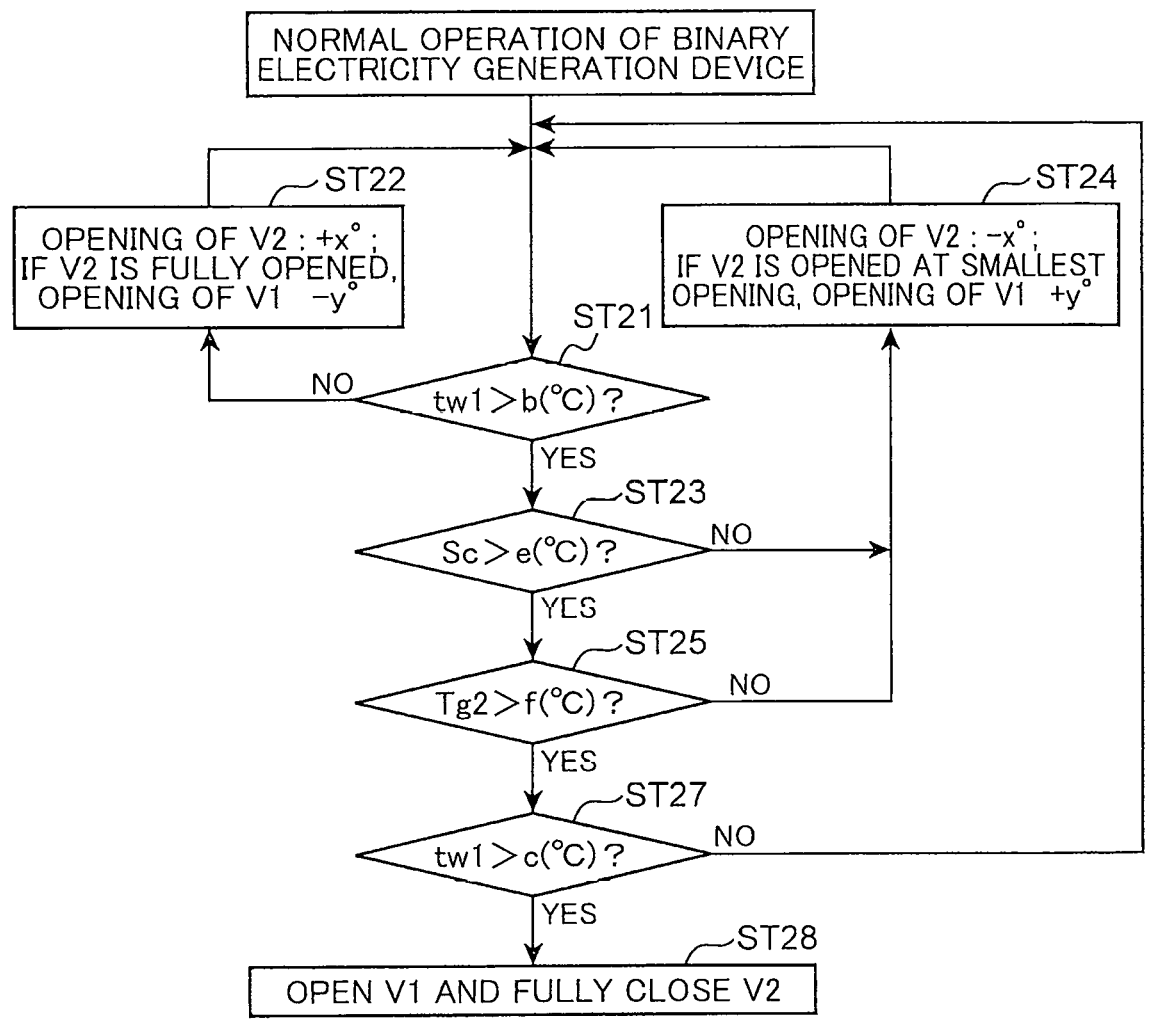
FIG. 3 is a flow chart for illustrating a normal operation in the exhaust heat recovery device.

Next, behaviors for controlling a normal operation will be described with reference to FIG. 3.

Also in a normal operation, a temperature of a heat medium which flows throughout the heat medium circuit 16 is checked, and control is exercised such that a temperature of a heat medium falls within a predetermined range. More specifically, in a step ST21, it is judged whether or not a temperature of a heat medium (the sensed value tw1 of the temperatures sensor Tw1) exceeds the lower limit value b (° C.) which is previously determined. If a temperature of a heat medium is equal to or lower than the lower limit value b, a shift to a step ST22 is made, where the valve control unit 53 increases an opening of the flow-rate regulation valve V2 by a predetermined opening. As a result of this, a flow rate of an exhaust gas which flows into the boiler 12 is increased, so that a temperature of a heat medium can be raised. It is noted that the valve control unit 53 reduces an opening of the flow-rate regulation valve V1 of the bypass passage 27 in a case where the flow-rate regulation valve V2 is fully opened.

On the other hand, if a temperature of a heat medium exceeds the lower limit value b, a shift to a step ST23 is made, where it is judged whether or not the supercooling degree Sc of a heat medium exceeds the threshold value e (° C.). If the supercooling degree Sc of a heat medium is equal to or lower than the threshold value e, the valve control unit 53 reduces an opening of the flow-rate regulation valve V2 by a predetermined opening (step ST14). As a result of this, a temperature of a hcat medium can be lowered because of reduction of a flow rate of an exhaust gas which flows into the boiler 12, so that the supercooling degree Sc of a heat medium can be increased. It is noted that the valve control unit 53 increases an opening of the flow-rate regulation valve V1 of the bypass passage 27 in a case where the flow-rate regulation valve V2 is opened at the smallest opening.

If the supercooling degree Sc of a heat medium has a value higher than the threshold value e, a shift to a step ST25 is made. In the step ST25, it is judged whether or not a temperature of an exhaust gas which is discharged from the boiler 12 (a sensed value tg2 of the temperature sensor Tg2) exceeds the predetermined temperature f (° C.). Then, if a temperature of an exhaust gas which is discharged from the boiler 12 is equal to or lower than the temperature f, a shift to the step ST24 is made, where the valve control unit 53 reduces an opening of the flow-rate regulation valve V2 by a predetermined opening. The temperature f is set to approximately 150° C., for example. Accordingly, an amount of heat which is removed from an exhaust gas by a heat medium is reduced since flowing amount of an exhaust gas through the bypass passage 27 is increased, so that a temperature of an exhaust gas is maintained at a temperature higher than approximately 150° C. As a result of this, acid dew-point corrosion of a pipeline through which an exhaust gas flows can be prevented.

On the other hand, if a temperature of an exhaust gas which is discharged from the boiler 12 exceeds the temperature f, a shift to a step ST27 is made, where it is judged whether or not a temperature of a heat medium exceeds the upper limit value c (° C.) which is previously determined. If a temperature of a heat medium is equal to or lower than the upper limit value c, a return to the step ST21 is made. As a result of this, it is possible to ensure a state in which a temperature of a heat medium falls within a predetermined range. On the other hand, if a temperature of a heat medium exceeds the upper limit value c, a shift to a step ST28 is made, where the valve control unit 53 fully closes the flow-rate regulation valve V2 of the main passage 25, and also opens the flow-rate regulation valve V1 of the bypass passage 27. That is, in a case where a temperature of a heat medium exceeds the upper limit value c, it is possible to ensure a state in which a temperature of a heat medium falls within a predetermined range by preventing an exhaust gas from being introduced into the boiler 12.

Figure 4:
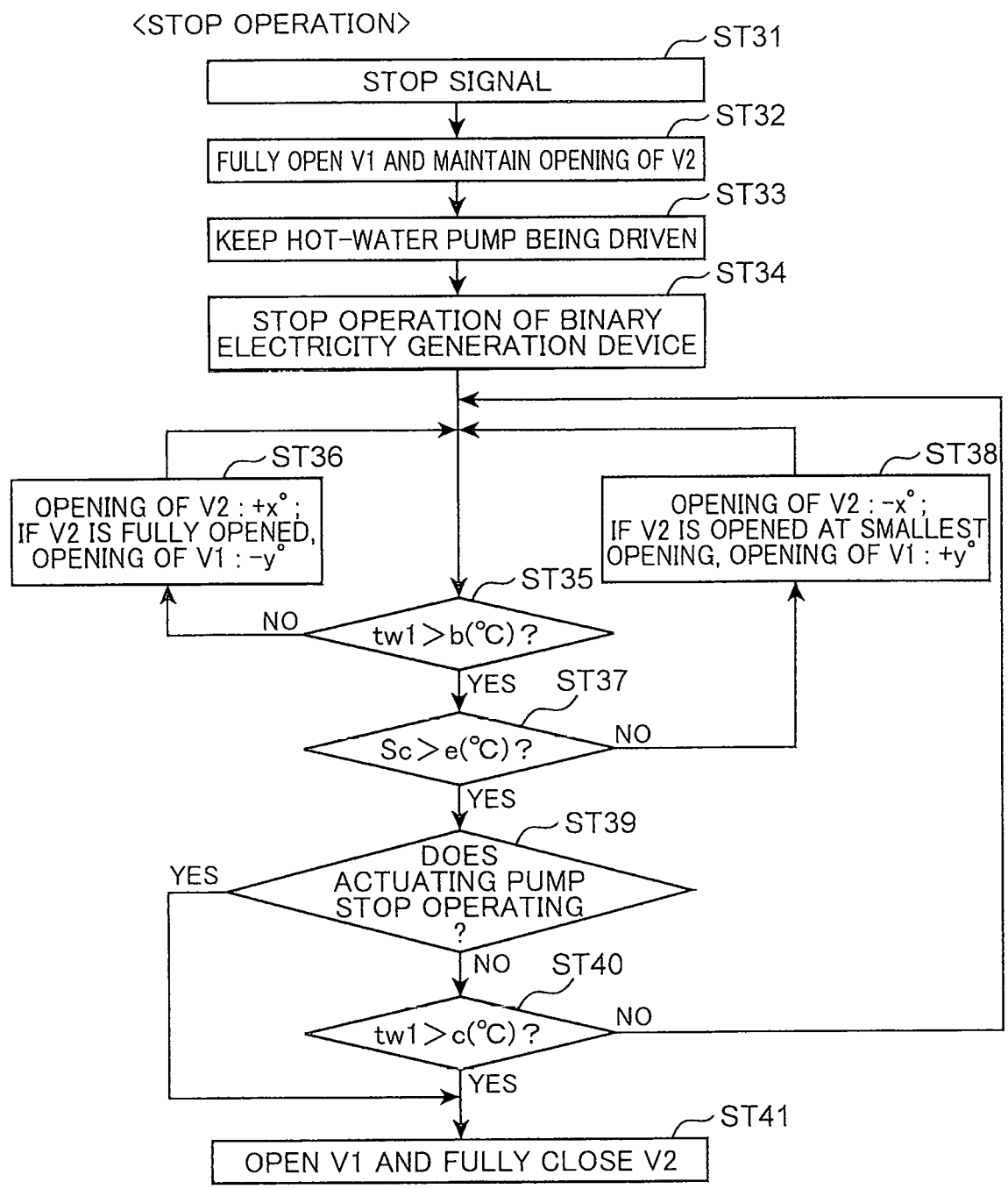
FIG. 4 is a flow chart for illustrating a stop operation in the exhaust heat recovery device.
Figure 5:
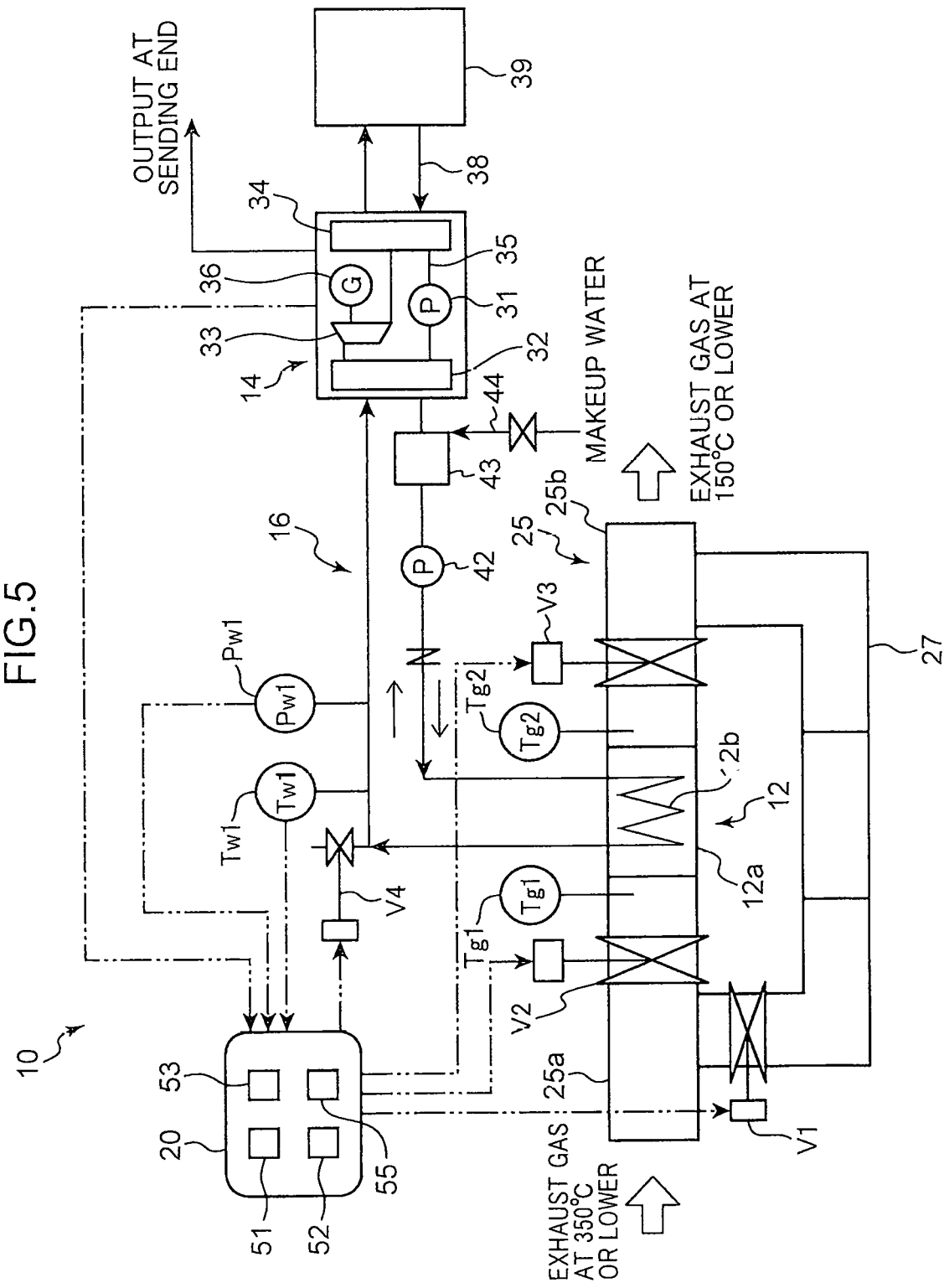
FIG. 5 is a view schematically showing an overall configuration of an exhaust heat recovery device according to another embodiment of the present invention.

Next, behaviors for control during a stop operation will be described with reference to FIG. 4.

A stop operation is started upon receipt of a stop signal by the controller 20 (step ST31). When the controller 20 receives a stop signal, the operation control unit 51, while fully opening the flow-rate regulation valve V1 of the bypass passage 27 on one hand, maintains an opening of the flow-rate regulation valve V2 of the main passage 25 as it is (step ST32). Also, the hot-water pump 42 is kept being driven (step ST33), and the actuating pump 31 is brought into a stop operation (step ST34).

Then, also until the actuating pump 31 stops operating, the valve control unit 53 exercises control for allowing a temperature of a heat medium to fall within a predetermined range while checking a temperature of a heat medium. More specifically, first, it is judged whether or not a temperature of a heat medium (the sensed value tw1 of the temperature sensor Tw1) exceeds the lower limit value b (° C.) which is previously determined (step ST35). If a temperature of a heat medium is equal to or lower than the lower limit value b, a shift to a step ST36 is made, where the valve control unit 53 increases an opening of the flow-rate regulation valve V2 by a predetermined opening. As a result of this, a flow rate of an exhaust gas which flows into the boiler 12 is increased, so that a temperature of a heat medium can be raised. It is noted that the valve control unit 53 reduces an opening of the flow-rate regulation valve V1 of the bypass passage 27 in a case where the flow-rate regulation valve V2 is fully opened.

On the other hand, if a temperature of a heat medium exceeds the lower limit value b, a shift to a step ST37 is made, where it is judged whether or not the supercooling degree Sc of a heat medium exceeds the predetermined threshold value e (° C.). If the supercooling degree Sc of a heat medium is equal to or lower than the threshold value e, the valve control unit 53 reduces an opening of the flow-rate regulation valve V2 by a predetermined opening (step ST38). As a result of this, a temperature of a heat medium can be lowered because of reduction of a flow rate of an exhaust gas which flows into the boiler 12, so that the supercooling degree Sc of a heat medium can be increased. It is noted that the valve control unit 53 increases an opening of the flow-rate regulation valve V1 of the bypass passage 27 in a case where the flow-rate regulation valve V2 is opened at the smallest opening.

If the supercooling degree Sc of a heat medium has a value higher than the threshold value e, the controller 20 first confirms that the actuating pump 31 stops operating, and then, judges whether or not a temperature of a heat medium exceeds the upper limit value c (° C.) which is previously determined (steps ST39 and ST40). In a case where the actuating pump 31 does not yet stop operating, if a temperature of a heat medium is equal to or lower than the upper limit value c, a return to the step ST35 is made. The steps ST35 to ST40 are repeated until the actuating pump 31 stops operating.

It is noted that in stopping the binary electricity generation device 14 (in other words, in stopping drive of the actuating pump 31), it is judged whether or not a temperature of a heat medium exceeds the lower limit value b (° C.) (step ST35) and it is judged whether or not the supercooling degree Sc of a heat medium exceeds the threshold value e (step ST37), for the following reasons. That is, to stop a binary electricity generation device might possibly result in evaporation of all of a working medium in the evaporator 32, making it impossible to bear a thermal load. In such a case, a temperature in a heat medium system becomes apt to rise. In order to prevent the foregoing event, control is exercised such that a specific temperature or higher and a specific supercooling degree or higher are obtained. It is noted that even while the binary electricity generation device 14 is being stopped, control is exercised such that cooling water continues flowing through the condenser 34 and a working medium continues being condensed, in the binary electricity generation device 14.

On the other hand, if a temperature of a heat medium exceeds the upper limit value c, the valve control unit 53 fully closes the flow-rate regulation valve V2 of the main passage 25, and opens the flow-rate regulation valve V1 of the bypass passage 27 (step ST41). In other words, in a case where a temperature of a heat medium exceeds the upper limit value c, an exhaust gas is prevented from being introduced into the boiler 12. As a result of this, it is possible to ensure a state in which a temperature of a heat medium falls within a predetermined range.

Subsequently, when the actuating pump 31 stops operating, a shift to the step ST41 is made, where the operation control unit 51 fully closes the flow-rate regulation valve V2 of the main passage 25 and opens the flow-rate regulation valve V1 of the bypass passage 27. Then, a stop operation is finished.

As described above, in the present embodiment, thermal energy is recovered in the binary electricity generation device 14, using a heat medium which is in a hot-water state, as a heal-source gas. Thus, thermal energy of an exhaust gas at a temperature of 350° C. or lower, for example, can be efficiently recovered. More specifically, since the binary electricity generation device 14 receives thermal energy via a heat medium which is in a hot-water state, an amount of heat input into the binary electricity generation device 14 can be increased. Accordingly, even in a case where a temperature of a heat-source gas is equal to or lower than 350° C., for example, generation of sufficient electricity can be achieved. In addition, in the present embodiment, boiling of the heat medium is suppressed and a heat medium is kept in a hot-water state. Thus, not only is generation of sufficient electricity ensured, but also a need for taking countermeasures to deal with a possible rise of a pressure in a pipe such as the boiler 12, is eliminated.

Further, the valve control unit 53 controls openings of the regulation valve members V1 and V2 such that a temperature of an exhaust gas passed through the boiler 12 is equal to or higher than a temperature of an acid dew-point of a corrosive component in an exhaust gas. Accordingly, a temperature of an exhaust gas from which heat is recovered is controlled such that the temperatures is equal to or higher than an acid dew-point, and so, a pipe and the like can be prevented from being corroded due to condensation of a corrosive component.

Further, in the present embodiment, a supercooling degree of a heat medium is maintained in a state of being equal to or higher than the predetermined threshold value e (° C.), so that boiling of a heat medium can be prevented. Accordingly, heat of a heat medium can be efficiently transferred to the binary electricity generation device 14. Also, since boiling of a heat medium can be suppressed, a state in which a working medium is efficiently evaporating in the evaporator 32 can be maintained, which can prevent reduction in an efficiency of heat recovery. Also, there is no need for taking countermeasures against a possible rise of a pressure in a pipe through which a heat medium flows. In addition, a temperature of a heat medium is controlled such that the temperature falls within a predetermined range, and so, an efficiency of heat recovery by the binary electricity generation device 14 can be enhanced.

Further, in the present embodiment, while the hot-water pump 42 is stopping operating, a supercooling degree of a heat medium is maintained in a state of being equal to or higher than the predetermined threshold value e (° C.), so that boiling of a heat medium can be suppressed. Accordingly, even while the hot-water pump 42 is stopping operating, heat of a heat medium can be efficiently transferred to the binary electricity generation device 14. In addition, even while the hot-water pump 42 is stopping operating, a temperature of a heat medium is controlled such that the temperature falls within a predetermined range, and so, an efficiency of heat recovery by the binary electricity generation device 14 can be enhanced.

Further, in the present embodiment, the valve control unit 53 is configured to increase an amount of an exhaust gas which flows into the bypass passage 27 by causing at least a part of an exhaust gas flowing toward the boiler 12 to flow into the bypass passage 27. More specifically, only by supplying a heat-source gas in such a manner that the heat-source gas being supplied does not flow into the boiler 12, but detours around the boiler 12 via the bypass passage 27, it is possible to reduce an amount of heat input into a heat medium. Therefore, it is possible to suppress boiling of a heat medium without a need for complicated control such as regulation of a flow rate of an exhaust gas itself, or the like.

Further, in the present embodiment, an amount of an exhaust gas flowing into the boiler 12 can be limited by reduction of an opening of the flow-rate regulation valve V2, and so, it is possible to allow an exhaust gas to efficiently take a detour to the bypass passage 27.

Further, in the present embodiment, since the supercooling-degree deriving unit 52 which derives a supercooling degree of a heat medium is included, a supercooling degree of a heat medium is derived and is maintained at a predetermined value or higher. Accordingly, boiling of a heat medium can be more surely suppressed.

Further, in the present embodiment, boiling of a heat medium is suppressed during a start-up operation. During a start-up operation, the binary electricity generation device 14 is not operating, and thus, there is a fear of boiling of a heat medium because of non-absorption of heat of a heat medium by the binary electricity generation device 14, in the heat medium circuit 16. In this connection, to exercise control such that boiling of a heat medium is suppressed during a start-up operation would be effective.

Further, during a stop operation, along with entry into a stop operation of the binary electricity generation device 14, heat of a heat medium is not absorbed by the binary electricity generation device 14 in the heat medium circuit 16, and thus, there is a fear of boiling of a heat medium. In this connection, to exercise control such that boiling of a heat medium is suppressed during a stop operation would be effective.

Since boiling of a heat medium is suppressed also during a normal operation, an amount of heat input into the binary electricity generation device 14 can be increased, and generation of sufficient electricity can be achieved.

Further, in the present embodiment, a temperature of a gas which is discharged from the boiler 12 is maintained at a predetermined temperature or higher, so that acid dew-point corrosion can be prevented even in a case where an exhaust gas or the like is used as a heat-source gas.

Figure 6:
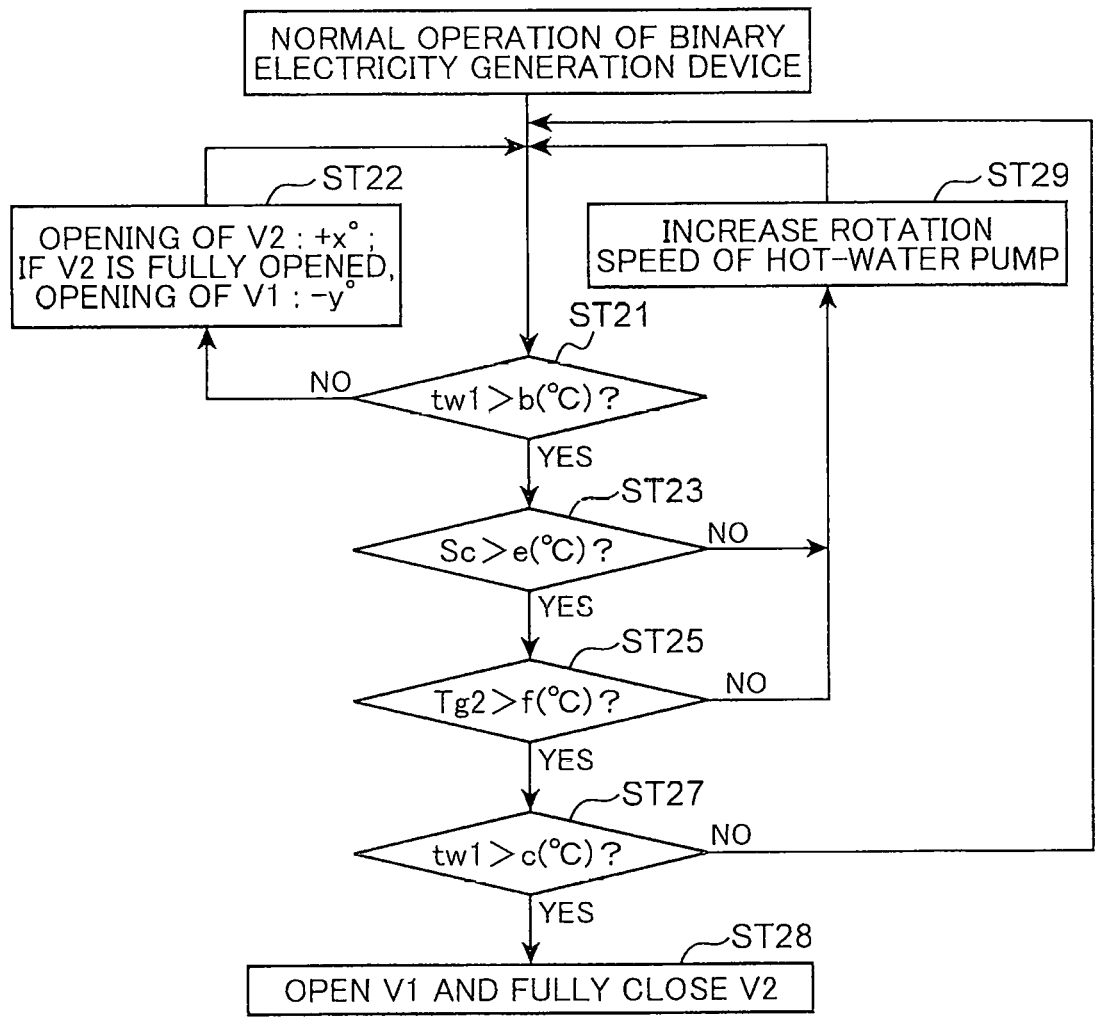
FIG. 6 is a flow chart for illustrating a normal operation in the exhaust heat recovery device in FIG. 5.

It should be noted that the present invention is not limited to the above-described embodiment, and various modifications, alterations, and the like are possible within a scope not departing from the essence thereof. For example, the hot-water pump 42 may be a pump which is driven at a specified rotation speed, or may include a pump of which rotation speed is adjustable. In a case where the hot-water pump 42 includes a pump of which rotation speed is adjustable, the controller 20 may include a pump control unit 55 which exercises control such that a rotation speed of the hot-water pump 42 is increased when the supercooling degree Sc of a heat medium is equal to or lower than the threshold value e. More specifically, since "NO" is given in the step ST23 when the supercooling degree Sc of a heat medium is equal to or lower than the threshold value e, the pump control unit 55 exercises control so as to increase a rotation speed of the hot-water pump 42 as shown in FIG. 6 (step ST29). Also, in this case, the controller 20 may control a rotation speed of the hot-water pump 42 in addition to controlling an opening of the flow-rate regulation valve V2, or may control a rotation speed of the hot-water pump 42 without controlling an opening of the flow-rate regulation valve V2. In this embodiment, an amount of a heat medium flowing into the boiler 12 is increased by an increase of a rotation speed of the hot-water pump 42, so that boiling of a heat medium in the boiler 12 can be suppressed.

In a case where the hot-water pump 42 includes a pump which is driven at a specified rotation speed, the tank 43 can be omitted.

Figure 7:
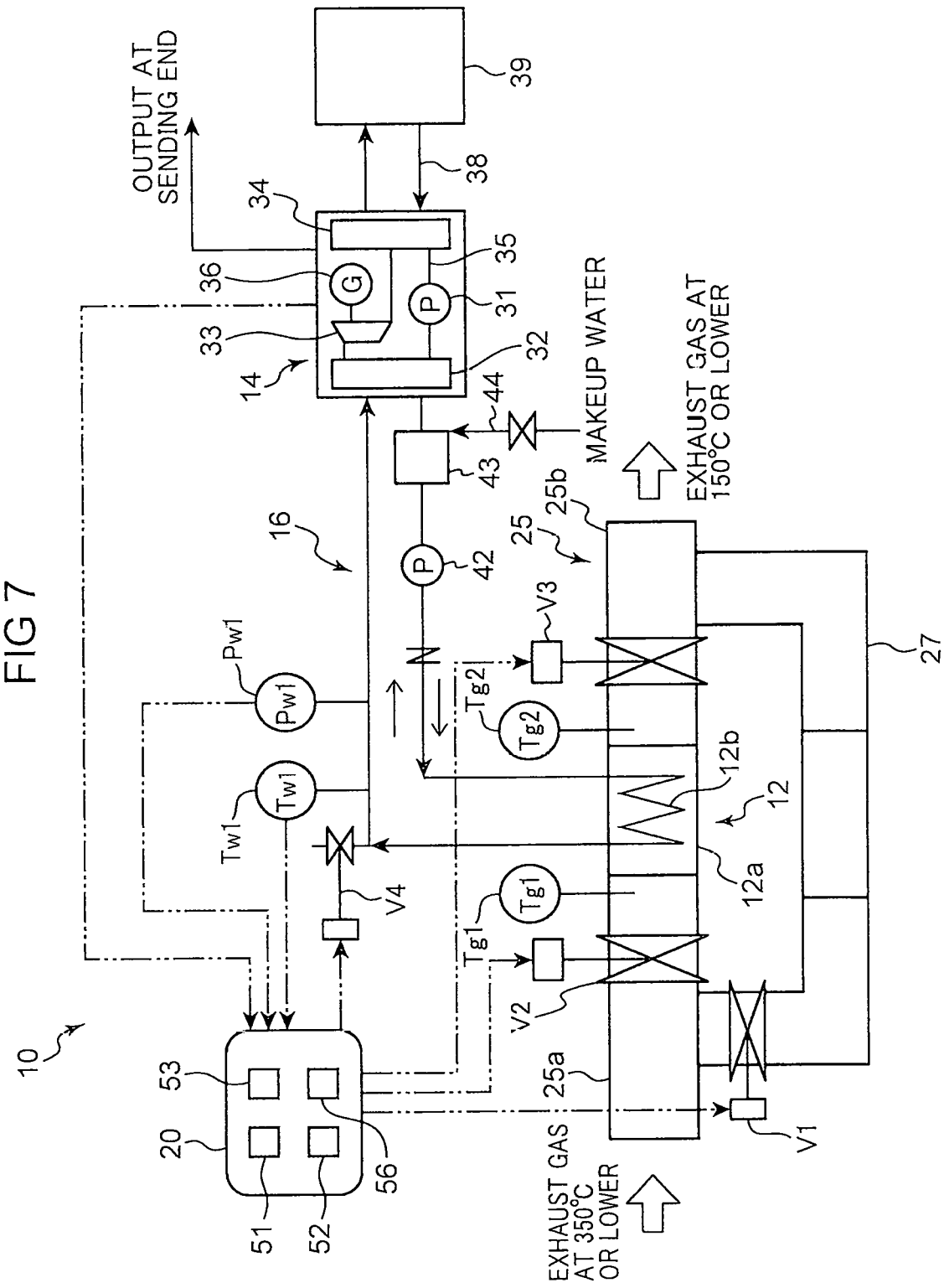
FIG. 7 is a view schematically showing an overall configuration of an exhaust heat recovery device according to another different embodiment of the present invention.

Also, the controller 20 may include an actuating-pump control unit 56 which exercises control such that a rotation speed of the actuating pump 31 is increased when the supercooling degree Sc of a heat medium is equal to or lower than the threshold value e, as shown in FIG. 7. Also, in this case, the controller 20 may control a rotation speed of the actuating pump 31 in addition to controlling an opening of the flow-rate regulation valve V7, or may control a rotation speed of the actuating pump 31 without controlling an opening of the flow-rate regulation valve V2.

Now, the above-described embodiments will be briefly described.

(1) The exhaust heat recovery device according to the above-described embodiments includes: a main passage through which an exhaust gas containing a corrosive component flows; a boiler provided in the main passage, the boiler being configured to heat a heat medium using the exhaust gas so as to place the heat medium in a hot-water state; a bypass passage connected to the main passage so as to detour around the boiler; a regulation valve member configured to regulate a flow rate of the exhaust gas flowing into the boiler; a heat medium circuit including a hot-water pump, the heat medium circuit being configured to circulate the heat medium that is heated so as to be placed in the hot-water state by the boiler; a binary electricity generation device including a circulation circuit through which a working medium circulates, the binary electricity generation device being configured to recover thermal energy from the heat medium in the heat medium circuit and generate electricity; and a valve control unit configured to control an opening of the regulation valve member such that a temperature of the exhaust gas passed through the boiler is equal to or higher than a temperature of an acid dew-point of the corrosive component in the exhaust gas.

In the exhaust heat recovery device according to the above-described embodiments, thermal energy is recovered in the binary electricity generation device from the heat medium which is in the hot-water state. Thus, thermal energy of the exhaust gas or high-temperature air which has a temperature of 350° C. or lower, for example, can be efficiently recovered. More specifically, since the binary electricity generation device receives thermal energy via the heat medium which is in the hot-water state, an amount of heat input into the binary electricity generation device can be made larger than that in a case where a gaseous heat medium is used. Accordingly, even in a case where the temperature of the heat-source gas is equal to or lower than 350° C., for example, generation of sufficient electricity can be achieved. In addition, the valve control unit controls the opening of the regulation valve member such that the temperature of the exhaust gas passed through the boiler is equal to or higher than an acid dew-point of the corrosive component in the exhaust gas. Consequently, the corrosive component can be prevented from condensing from a low-temperature exhaust gas from which heat is recovered by the heat medium. Therefore, corrosion of a pipe and the like can be prevented.

(2) The above-described exhaust heat recovery device may further include a temperature sensor configured to detect the temperature of the heat medium that is in the hot-water state; and a pressure sensor configured to detect a pressure of the heat medium that is in the hot-water state. In this case, the valve control unit may control the opening of the regulation valve member such that the temperature of the heat medium is in a predetermined range and a supercooling degree of the heat medium is maintained in a state in which the supercooling degree has a predetermined value or higher.

In this embodiment, the supercooling degree of the heat medium is maintained in a state in which the supercooling degree has the predetermined value or higher, so that boiling of the heat medium can be suppressed. Accordingly, heat of the heat medium can be efficiently transferred to the binary electricity generation device. Also, boiling of the heat medium is suppressed, and the heat medium is kept in the hot-water state. Thus, not only is generation of sufficient electricity ensured, but also a need for taking countermeasures to deal with a possible rise of a pressure in a pipe such as the boiler, is eliminated. Also, the temperature of the heat medium is controlled such that the temperature falls within a predetermined range, so that an efficiency of heat recovery by the binary electricity generation device can be enhanced.

(3) Further, the above-described exhaust heat recovery device may include a temperature sensor configured to detect a temperature of the heat medium that is in the hot-water state; and a pressure sensor configured to detect a pressure of the heat medium that is in the hot-water state. In this case, the valve control unit may control the opening of the regulation valve member such that the temperature of the heat medium is equal to or higher than a predetermined temperature and a supercooling degree of the heat medium is maintained in a state in which the supercooling degree has a predetermined value or higher in stopping the hot-water pump.

In this embodiment, the supercooling degree of the heat medium is maintained in a state in which the supercooling degree has the predetermined value or higher while the hot-water pump is stopping operating, so that boiling of the heat medium can be suppressed also while the hot-water pump is stopping operating. Accordingly, heat of the heat medium can be efficiently transferred to the binary electricity generation device. In addition, the temperature of the heat medium is controlled such that the temperature falls within the predetermined range also while the hot-water pump is stopping operating, so that an efficiency of heat recovery by the binary electricity generation device can be enhanced.

(4) The above-described regulation valve member may include a flow-rate regulation valve provided in the bypass passage. In this case, the valve control unit may be configured to control an opening of the flow-rate regulation valve so as to increase an amount of a heat-source gas that flows into the bypass passage so that the supercooling degree of the heat medium has the predetermined value or higher. In this embodiment, only by supplying the heat-source gas in such a manner that the heat-source gas being supplied does not flow into the boiler, but detours around the boiler via the bypass passage, it is possible to reduce an amount of heat input into the heat medium. Accordingly, it is possible to suppress boiling of the heat medium without a need for complicated control such as regulation of a flow rate of the heat-source gas itself, or the like.

(5) The regulation valve member may include a flow-rate regulation valve provided in the main passage. In this case, the valve control unit is configured to reduce an opening of the flow-rate regulation valve so that the supercooling degree of the heat medium has the predetermined value or higher. In this embodiment, an amount of exhaust gas flowing into the boiler can be limited by reduction of an opening of the flow-rate regulation valve, so that it is possible to allow the heat-source gas to efficiently take a detour to the bypass passage.

(6) The above-described exhaust heat recovery device may further include: a temperature sensor configured to detect a temperature of the heat medium that is in the hot-water state; a pressure sensor configured to detect a pressure of the heat medium that is in the hot-water state; and a pump control unit configured to increase a rotation speed of the hot-water pump so that the supercooling degree of the heat medium is maintained in a state in which the supercooling degree has a predetermined value or higher. In this embodiment, an amount of the heat medium flowing into the boiler is increased by an increase of a rotation speed of the hot-water pump, which can suppress boiling of the heat medium in the boiler.

(7) The binary electricity generation device according to the above described embodiments is a binary electricity generation device which is used as the binary electricity generation device of the above-described exhaust heat recovery device.

As described above, according to the present embodiments, heat can be efficiently recovered from an exhaust gas containing a corrosive component.

The invention claimed is:

1. An exhaust heat recovery device comprising:
a main passage through which an exhaust gas containing a corrosive component flows;
a boiler provided in the main passage, the boiler being configured to heat a heat medium using the exhaust gas so as to place the heat medium in a hot-water state;
a bypass passage connected to the main passage so as to detour around the boiler;
a regulation valve member configured to regulate a flow rate of the exhaust gas flowing into the boiler;
a heat medium circuit including a hot-water pump, the heat medium circuit being configured to circulate the heat medium that is heated so as to be placed in the hot-water state by the boiler;
a binary electricity generation device including a circulation circuit through which a working medium circulates, the binary electricity generation device being configured to recover thermal energy from the heat medium in the heat medium circuit and generate electricity;
a valve control unit configured to control an opening of the regulation valve member such that a temperature of the exhaust gas passed through the boiler is equal to or higher than a temperature of an acid dew-point of the corrosive component in the exhaust gas;
a temperature sensor configured to detect a temperature of the heat medium that is in the hot-water state; and
a pressure sensor configured to detect a pressure of the heat medium that is in the hot-water state,
wherein the valve control unit controls the opening of the regulation valve member such that the temperature of the heat medium is in a predetermined range and a supercooling degree of the heat medium is maintained in a state in which the supercooling degree has a predetermined value or higher.

2. The exhaust heat recovery device according to claim 1, wherein
the regulation valve member includes a flow-rate regulation valve provided in the bypass passage, and
the valve control unit is configured to control an opening of the flow-rate regulation valve so as to increase an amount of a heat-source gas that flows into the bypass passage so that the supercooling degree of the heat medium has the predetermined value or higher.

3. The exhaust heat recovery device according to claim 1, wherein
the regulation valve member includes a flow-rate regulation valve provided in the main passage, and
the valve control unit is configured to reduce an opening of the flow-rate regulation valve so that the supercooling degree of the heat medium has the predetermined value or higher.

4. An exhaust heat recovery device comprising:
a main passage through which an exhaust gas containing a corrosive component flows;
a boiler provided in the main passage, the boiler being configured to heat a heat medium using the exhaust gas so as to place the heat medium in a hot-water state;
a bypass passage connected to the main passage so as to detour around the boiler;
a regulation valve member configured to regulate a flow rate of the exhaust gas flowing into the boiler;
a heat medium circuit including a hot-water pump, the heat medium circuit being configured to circulate the heat medium that is heated so as to be placed in the hot-water state by the boiler;
a binary electricity generation device including a circulation circuit through which a working medium circulates, the binary electricity generation device being configured to recover thermal energy from the heat medium in the heat medium circuit and generate electricity;
a valve control unit configured to control an opening of the regulation valve member such that a temperature of the exhaust gas passed through the boiler is equal to or higher than a temperature of an acid dew-point of the corrosive component in the exhaust gas;
a temperature sensor configured to detect a temperature of the heat medium that is in the hot-water state; and a pressure sensor configured to detect a pressure of the heat medium that is in the hot-water state, wherein the valve control unit controls the opening of the regulation valve member such that the temperature of the heat medium is equal to or higher than a predetermined temperature and a supercooling degree of the heat medium is maintained in a state in which the supercooling degree has a predetermined value or higher in stopping the hot-water pump.

5. The exhaust heat recovery device according to claim 4, wherein the regulation valve member includes a flow-rate regulation valve provided in the bypass passage, and the valve control unit is configured to control an opening of the flow-rate regulation valve so as to increase an amount of a heat-source gas that flows into the bypass passage so that the supercooling degree of the heat medium has the predetermined value or higher.

6. The exhaust heat recovery device according to claim 4, wherein the regulation valve member includes a flow-rate regulation valve provided in the main passage, and the valve control unit is configured to reduce an opening of the flow-rate regulation valve so that the supercooling degree of the heat medium has the predetermined value or higher.

7. An exhaust heat recovery device comprising:

a main passage through which an exhaust gas containing a corrosive component flows;

a boiler provided in the main passage, the boiler being configured to heat a heat medium using the exhaust gas so as to place the heat medium in a hot-water state;

a bypass passage connected to the main passage so as to detour around the boiler;

a regulation valve member configured to regulate a flow rate of the exhaust gas flowing into the boiler;

a heat medium circuit including a hot-water pump, the heat medium circuit being configured to circulate the heat medium that is heated so as to be placed in the hot-water state by the boiler;

a binary electricity generation device including a circulation circuit through which a working medium circulates, the binary electricity generation device being configured to recover thermal energy from the heat medium in the heat medium circuit and generate electricity;

a valve control unit configured to control an opening of the regulation valve member such that a temperature of the exhaust gas passed through the boiler is equal to or higher than a temperature of an acid dew-point of the corrosive component in the exhaust gas;

a temperature sensor configured to detect a temperature of the heat medium that is in the hot-water state;

a pressure sensor configured to detect a pressure of the heat medium that is in the hot-water state; and a pump control unit configured to increase a rotation speed of the hot-water pump so that the supercooling degree of the heat medium is maintained in a state in which the supercooling degree has a predetermined value or higher.

* * * * *